United States Patent
Cheng et al.

(10) Patent No.: US 6,414,643 B2
(45) Date of Patent: Jul. 2, 2002

(54) ANTENNA FOR PORTABLE DEVICE (75) Inventors: Wei-Li Cheng, Taipei; Chien-Hsing Fang, Dali, both of (TW)

(73) Assignee: Acer NeWeb Corp. (TW)

( * ) Notice: Subject to any disclaimer, the term of this patent is extended or adjusted under 35 U.S.C. 154(b) by 0 days.

(21) Appl. No.: 09/853,785

(22) Filed: May 14, 2001

(30) Foreign Application Priority Data

May 12, 2000 (TW) ........................................ 89109194 A (51) Int. Cl.[7] .................................................. H04B 1/38
(52) U.S. Cl. .......................... 343/702; 455/575; 455/90
(58) Field of Search ........................... 343/702; 455/90, 455/550, 556, 575, 557, 558

(56) References Cited

U.S. PATENT DOCUMENTS

| | | | |
|---|---|---|---|
| 5,907,580 A | * | 5/1999 | Cummings .................. 375/220 |
| 6,259,932 B1 | * | 7/2001 | Constien ..................... 455/556 |
| 6,272,356 B1 | * | 8/2001 | Dolman et al. ............. 455/550 |
| 6,307,513 B1 | * | 10/2001 | Gaucher et al. ............ 343/702 |

* cited by examiner

Primary Examiner—Don Wong
Assistant Examiner—James Clinger
(74) Attorney, Agent, or Firm—Michael D. Bednarek; Shaw Pittman LLP (57) ABSTRACT

This invention relates to an antenna for a portable device. The portable device comprises a display, a host. In addition, a hinge is provided to connect the display and the host such that the display can be rotated relative to the host. Therefore, the portable device can be opened and closed accordingly. Furthermore, a receiver is installed within the hinge so that an antenna can be fixed in the hinge. Thereby, wireless transmitting of the portable device can be achieved through the antenna.

14 Claims, 9 Drawing Sheets fig. 1 fig. 2 fig. 3 fig. 4 fig. 6 fig. 7 fig. 8 fig. 9

Average gain - 0.47 dBi

ANTENNA FOR PORTABLE DEVICE

BACKGROUND OF THE INVENTION

1. Field of the Invention

The present invention relates an antenna for a portable device, and especially relates for an antenna which is received within a hinge of the portable device and is combined into the portable device, such as a notebook computer or a personal digital assistance. Thus, the present invention provides a wireless communication of the portable device.

2. Description of the Related Art

A local area network (LAN) means that several computers are connected each other in a specified area. For instance, two or more computers have working stations installed thereon and are connected through cable or wireless communication. Therefore, computers in the LAN can share and transmit data.

Most computers recently are connected through cables. However, the following defects occurs by using cables to form the LAN. Firstly, it is difficult and expensive to change the location of the client computer after completely installation of the network. Second of all, the cable should be added or removed if new client computer have been changed. This would be heavy work for the network provider. Thirdly, a cable network installation may have a great influence on the view of the building. Furthermore, the cable network installation is not so flexible in arrangement.

For stated above, wireless LAN technology is increasingly developed and it is intend to replace the cable network installation.

Figure 1:
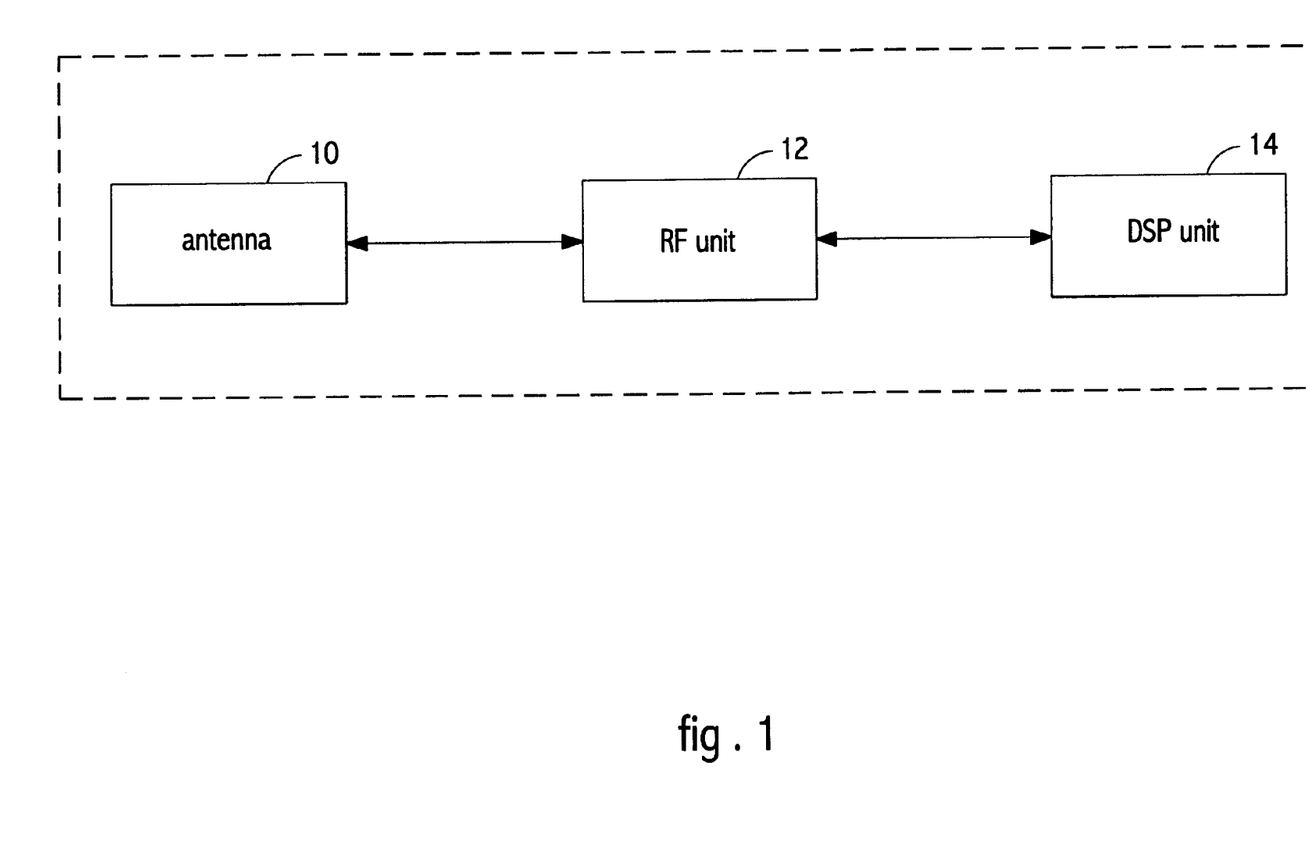
FIG. 1 schematically depicts a circuit diagram of a wireless network card.

Please refer to FIG. 1 which shows a circuit diagram of a wireless network card. The circuit diagram comprises an antenna 10, a RF unit 12 and a DSP unit 14. These are necessary elements so as to achieve the wireless communication. The antenna 10 is used for receiving and transmitting signal. The RF unit 12 is used for processing radio frequency signal. The DSP unit 14 is used for coding and decoding the signal.

Figure 2:
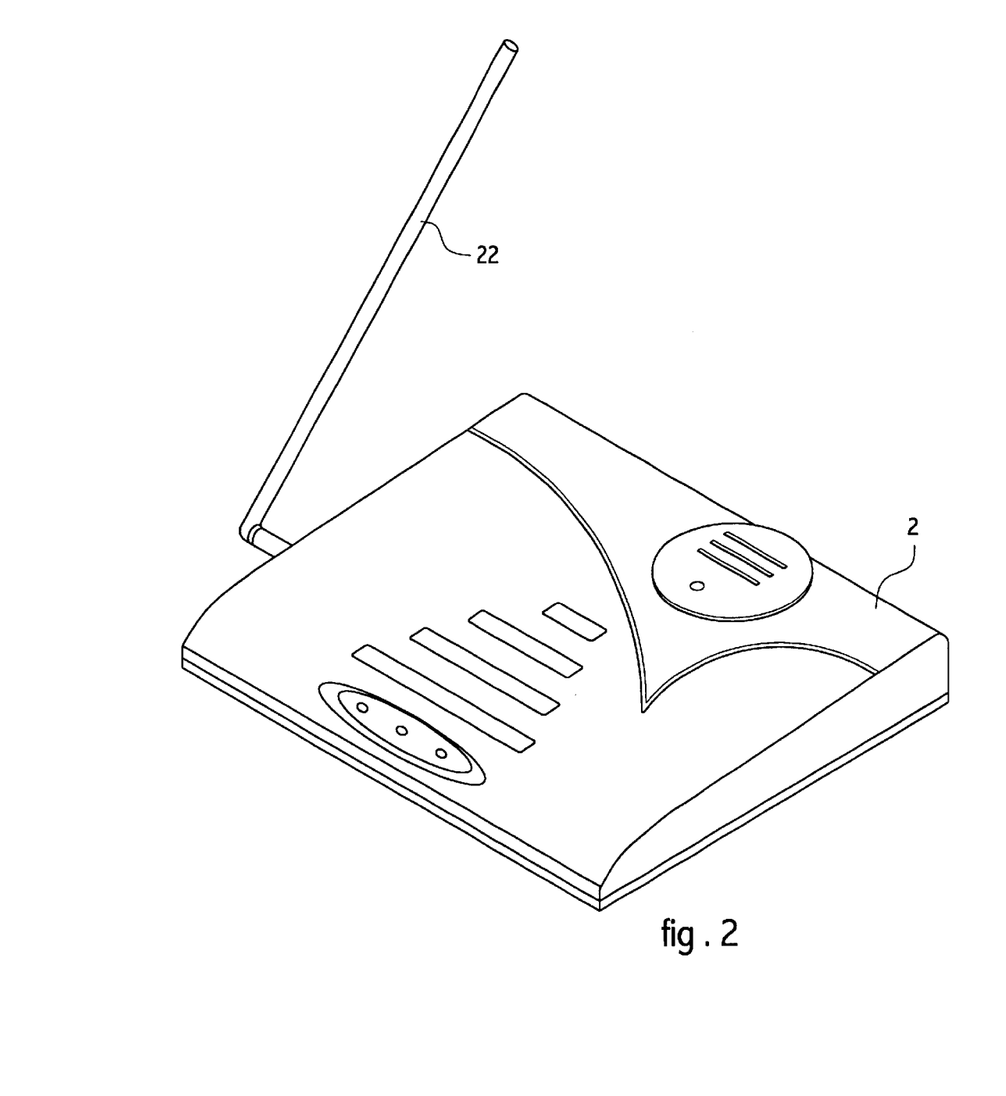
FIG. 2 schematically depicts a conventional wireless network card.

FIG. 2 shows the architecture of a wireless network card 2. The wireless network card 2 is formed as a rectangle and hollow housing which comprises an antenna 22, a RF unit and a DSP unit wherein the RF unit and the DSP unit are installed within the housing. For increasing the performance of the transmitting of the wireless network card 2, the antenna 2 protrudes the housing. However, such installation will cause inconvenient for end users when moving or operating the computer. Especially for the user of the notebook computer, the external wireless network card 2 must be carried so that it may cause damage of the wireless network card 2. Thus, if the wireless network card 2 can be built-up in the notebook computer, it is convenient for users and decreases the possibility of the damage for the wireless network card 2.

Figure 3:
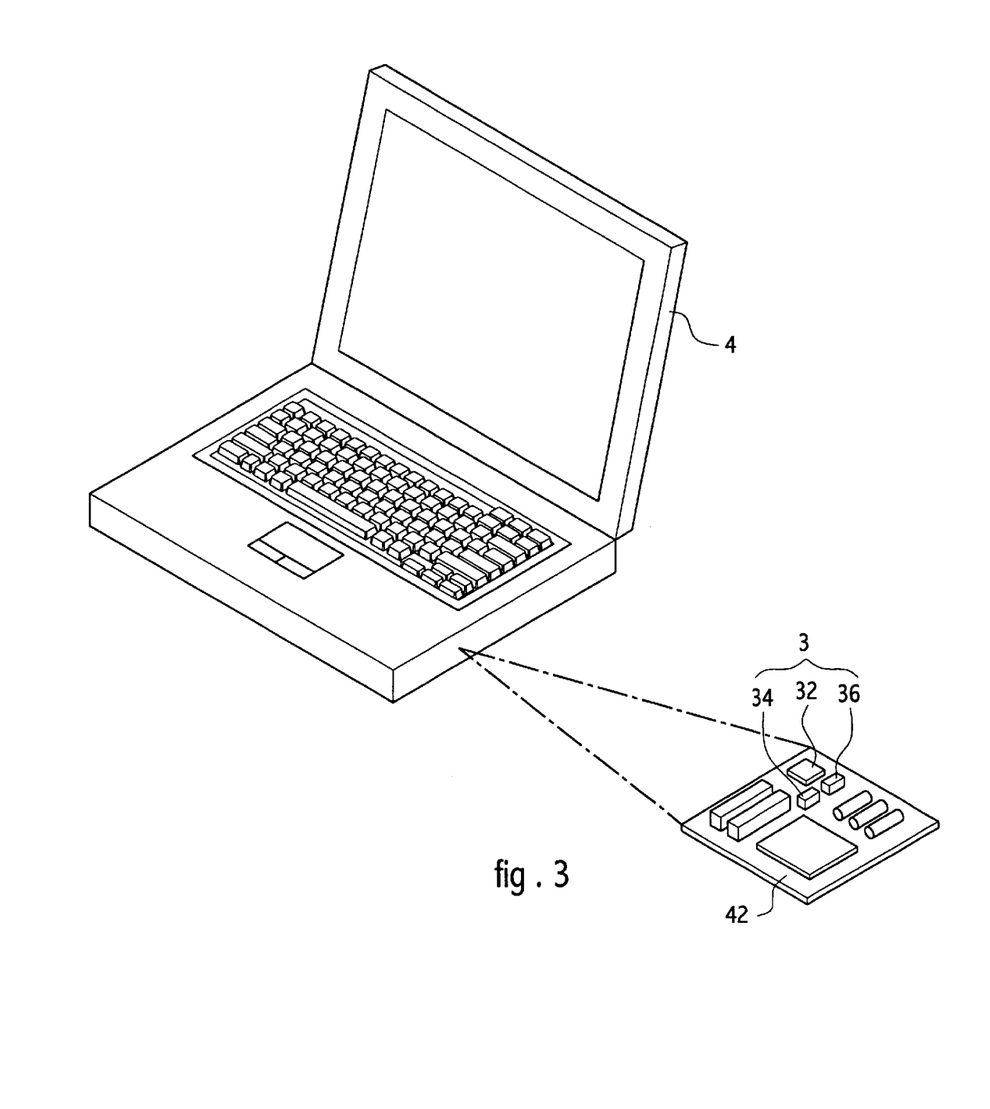
FIG. 3 schematically depicts a perspective view of another type of a conventional wireless network card.

Referring to FIG. 3, it shows another type of a wireless network card 3. The wireless network card 3 is built within a main board 42 of a notebook computer 4. An antenna 32 of the wireless network card 3 is electroplated so that it can be fixed on the main board 42. Furthermore, a RF unit 34 and a DSP unit 36 are formed within an IC chip which can be bounded in the main board 42. Thus, a small volume of the card and convenient use for the card can be achieved by the built-up wireless network card 3. However, the housing of the present notebook computer 4 is formed of an alloy of magnesium and aluminum and the antenna 32 is fixed between electric components of the main board 42. Thus, the shielding effectiveness will influence the transmitting quality of the wireless network card 4.

SUMMARY OF THE INVENTION

Therefore, it is an objective of the present invention to provide an antenna for a portable device and the antenna is installed within a hinge for increasing the convenience of the operation and carry for users.

Another object of the present invention is to provide an antenna for a portable device and the antenna is installed within a hinge for increasing the transmitting quality of the network card and decreasing the shielding effectiveness. The portable device comprises a display, a host. In addition, a hinge is provided to connect the display and the host such that the display can be rotated relative to the host. Therefore, the portable device can be opened and closed accordingly. Furthermore, a receiver is installed within the hinge so that an antenna can be fixed in the hinge.

BRIEF DESCRIPTION OF DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE INVENTION

Figure 4:
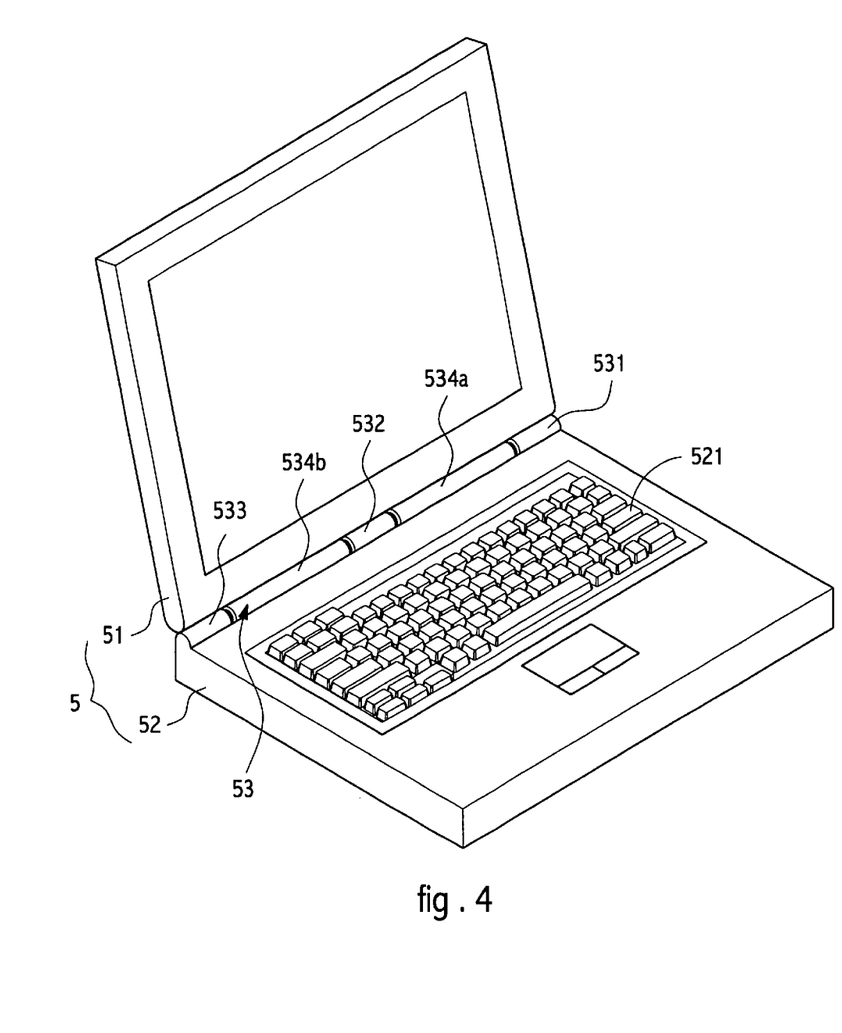
FIG. 4 shows a perspective view of a notebook computer having an antenna in accordance with a first preferred embodiment of the present invention.

With reference to FIG. 4, it shows a perspective view of a portable device having an antenna in accordance with a first preferred embodiment of the present invention. The portable device is a kind of electric information apparatus having an open state and a close state, i.e. a notebook computer or a personal digital assistance (PDA). A notebook computer will be identified as the portable device in the following description so as to clearly the content of the present invention. The notebook computer 5 comprises a display 51 an a host 52, wherein the host 52 proceeds with digital data and the display 51 outputs the proceeded data. The display 51 is connected to the host 52 through a hinge 53. The hinge 53 has pivot portions 531, 532 and 533 to provide rotating machine so that the display 51 can be rotated relative to the host 52 and has the open state and the close state. As shown in FIG. 4, the display 51 and the host 52 are rectangle plates. In a preferred embodiment, the display 51 is a LCD panel and the host 52 comprises a keyboard 521 and a main board.

Figure 5:
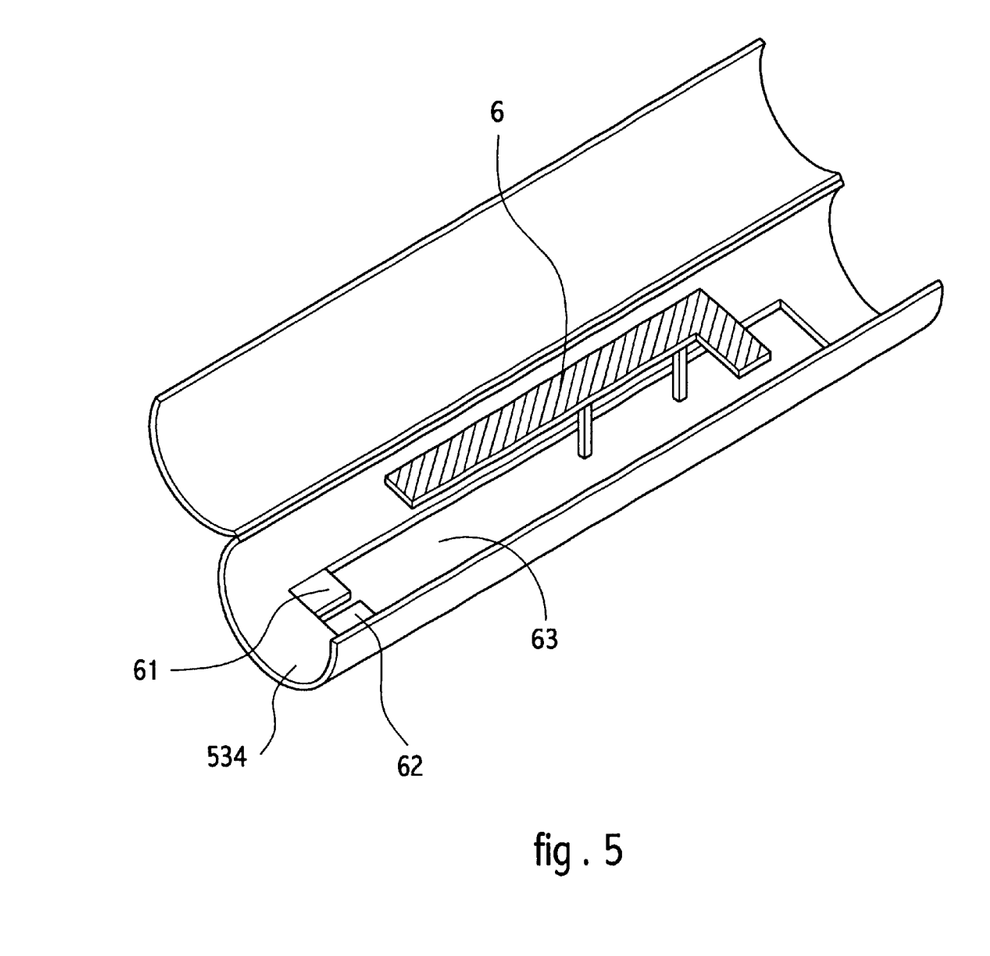
FIG. 5 schematically depicts partly enlarged view of a hinge in accordance with the first preferred embodiment of the present invention.

The hinge 53 of the notebook computer 5 comprises a non-pivot portion 53 and the non-pivot portion 53 is hollow. This hollow structure forms receivers 534b and 534b so that an antenna 6 can be installed within the hollow structure as shown in FIG. 5. As the hinge 53 of the notebook computer 5 is not so big to receive all kind of antennas, the antenna 6 should be selected from mini antennas, such as inversed F type antennas, ceramics antennas, rod antennas or spiral antennas.

In addition, as the antenna 6 should be coupled to a RF unit 61 and a DSP unit 62 to convert the received signal, the RF unit 61 and the DSP unit 62 can be formed on a circuit board 63 and the circuit board 63 and the antenna 6 are together installed within the receiver 534 of the non-pivot portion 53. In another embodiment, the RF unit 61 and the DSP unit 62 can be also coupled on the main board 54 of the notebook computer 54 and these units are connected to the antenna 6 through wires.

Figure 6:
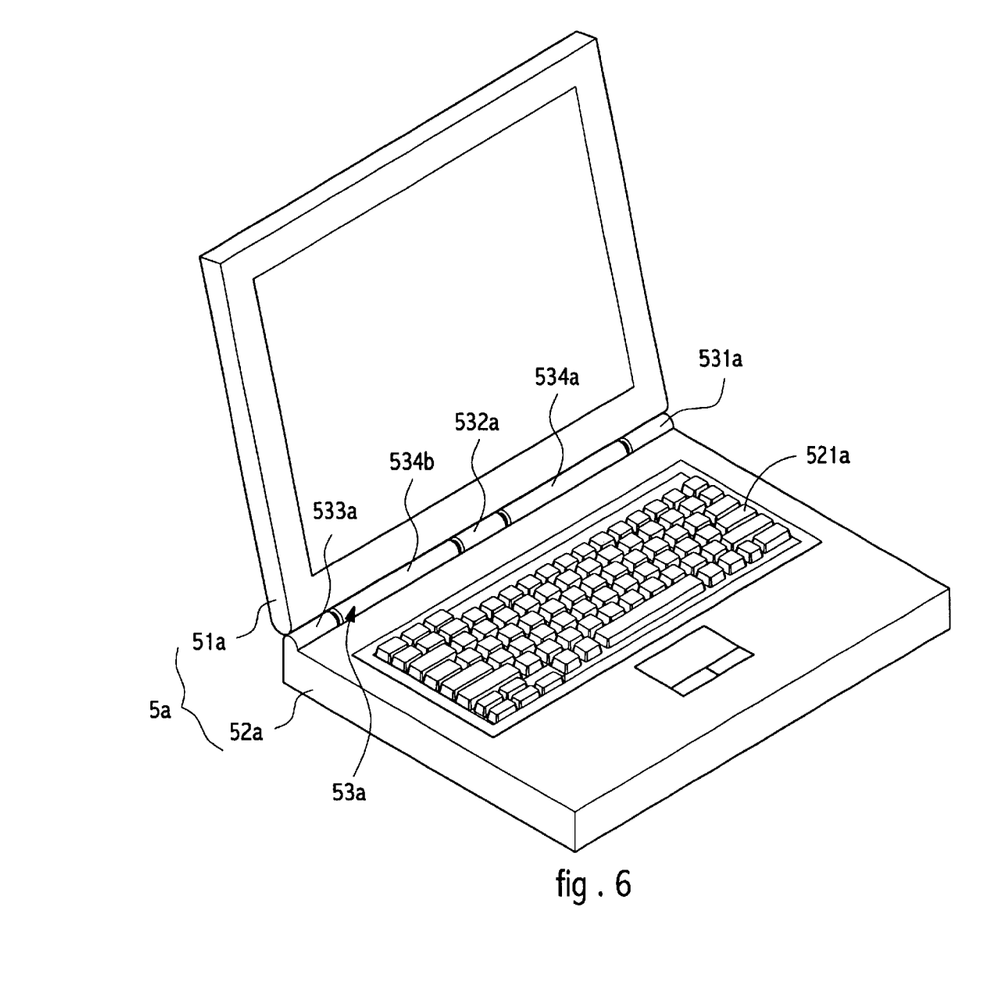
FIG. 6 shows a perspective view of a notebook computer having an antenna in accordance with a second preferred embodiment of the present invention.

With reference to FIG. 4, it shows a perspective view of a notebook computer 5a having an antenna 53a in accordance with a second preferred embodiment of the present invention. The most popular wireless international protocols are Bluetooth protocol and IEEE 802.11 protocol. However, these protocols can not communicate each other and the computer system merely selects one of these protocols. For stated above, the present invention provides two receivers 543a and 534b on two sides of hinges 53a in the notebook computer 5a so that a first antenna 6a and a second antenna 6b can be installed with the receivers 543a and 534b separately. The first antenna 6a can be installed for the use of Bluetooth protocol and the second antenna 6b can be installed for the use of IEEE 802.11 protocol.

Figure 7:
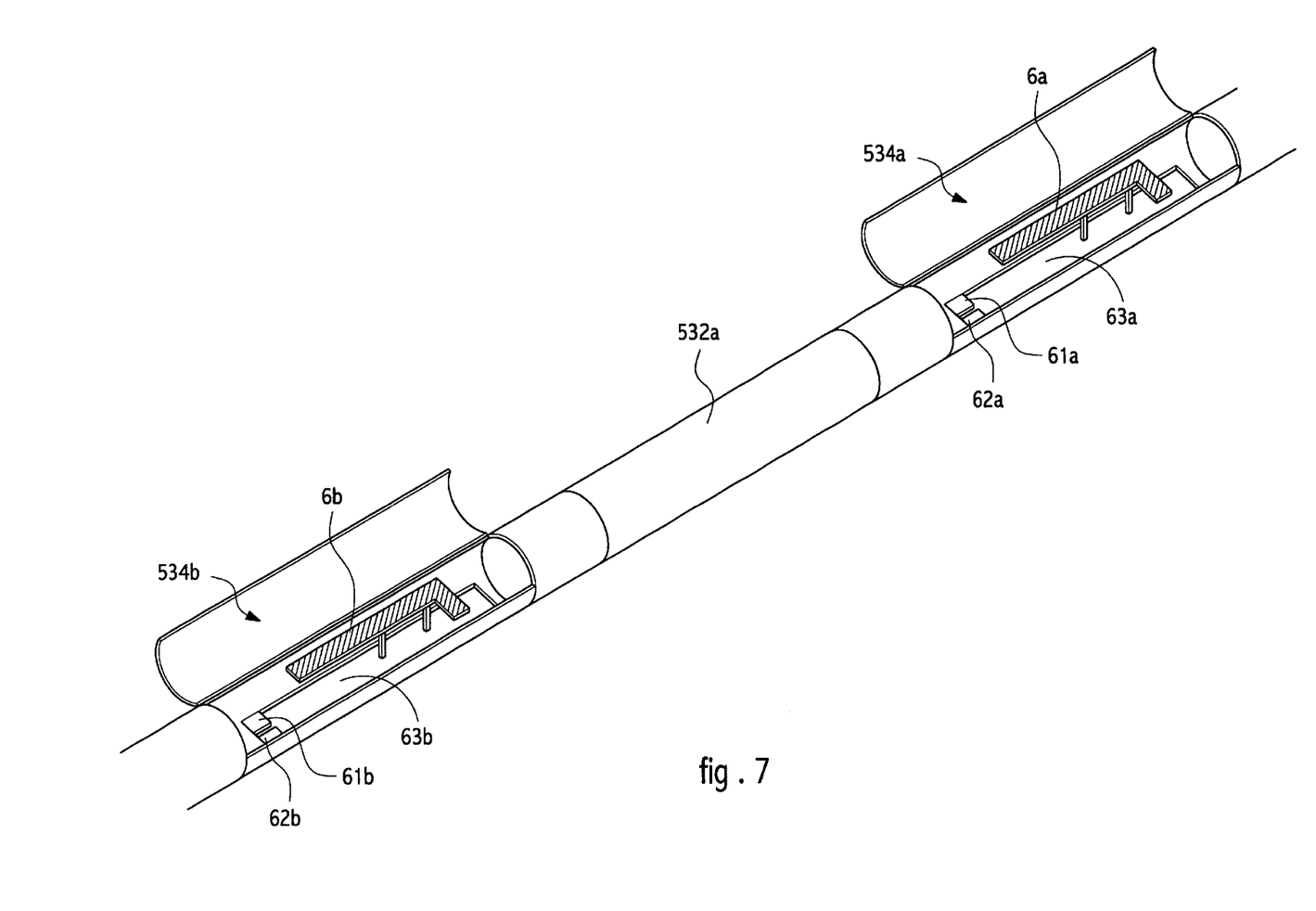
FIG. 7 schematically depicts partly enlarged view of a hinge in accordance with the second preferred embodiment of the present invention.

In the second embodiment, there are two antennas 6a and 6b installed within the notebook computer 5a for receiving signal from two different protocols. Thus, the user of the notebook computer 5a can enable either select Bluetooth protocol or IEEE 802.11 protocol by selecting one of the antennas 6a and 6b. Furthermore, as shown in FIG. 7, the first antenna 6a and the second antenna 6b should be coupled to RF units 61a, 61b and DSP units 62a, 62b separately so as to convert the received signal. The RF units 61a, 61b and DSP units 62a, 62b can be formed on circuit boards 63a, 63b and the circuit boards 63a, 63b and the antennas 6a, 6b are together installed within the receivers 534a, 534b of the non-pivot portions 53a. In another embodiment, a chip set combining the RF unit function and the DSP unit function can be also coupled on the main board of the notebook computer 54 and the chip set is connected to the antennas 6a and 6b through wires. Thus, the present invention merely needs one chip set for proceeding with digital signal.

Figure 8:
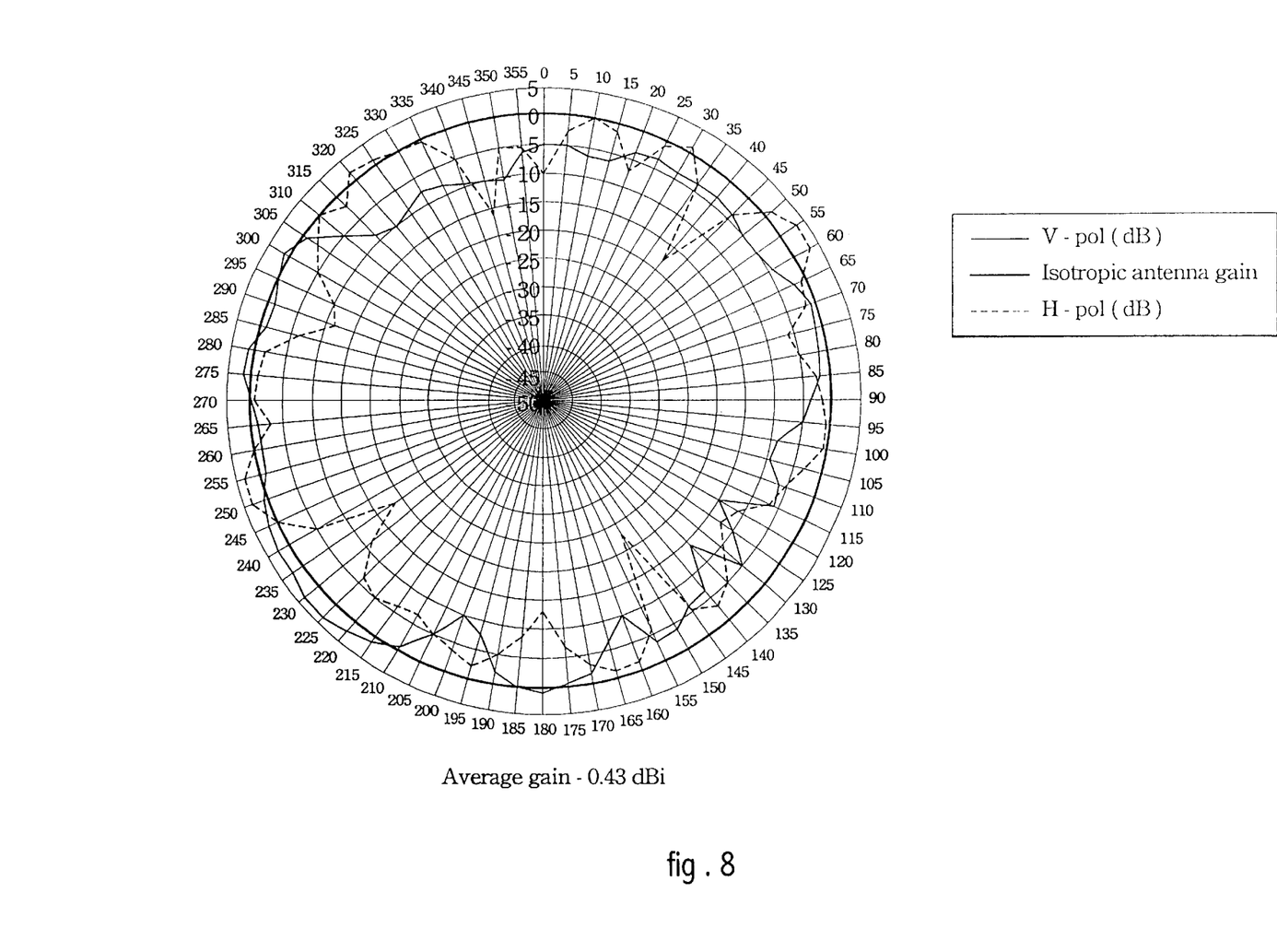
FIG. 8 shows the signal gain comparison of the antenna of the present invention when the display is open; and, FIG. 9 shows the signal gain comparison of the antenna of the present invention when the display is closed.

FIG. 8 shows the signal gain comparison of the antenna of the present invention when the display is open. The experiment data shows vertical pole gain (V-pol),horizontal polegarn (H-pol) and isotropic antenna gain of the monopole antenna. As shown in FIG. 8, I curve indicates the gain of the monopole antenna from 0° to 360° of the spherical surface area and it is nearly 0 dBi. Similarly, V curve and H curve indicate the vertical pole gain and the horizontal pole garn from the same area. It is noted that FIG. 8 discloses the compensation for the vertical pole and the horizontal pole in every angle of this area. The average gain of the present invention is −0.43 dBi and it is quite closed to the gain value of the monopole antenna.

Figure 9:
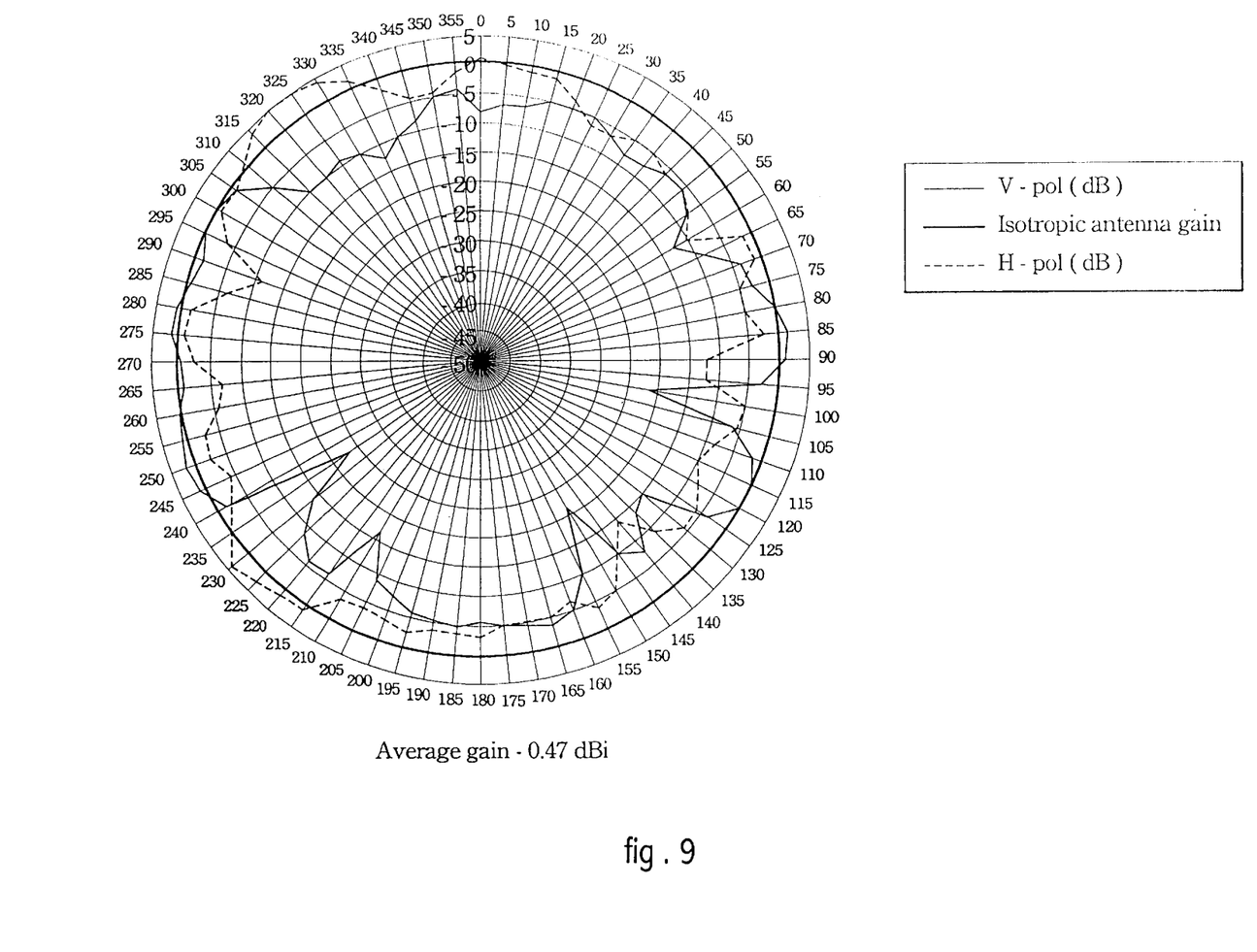

FIG. 9 shows the signal gain comparison of the antenna of the present invention when the display is closed. The experiment data shows verticalpole gain (V-pol), horizontal pole garn (H-pol) and isotropic antenna gain of the monopole antenna and it is nearly 0 dBi. As shown in FIG. 9, I curve indicates the gain of themonopole antenna from 0° to 360° of the spherical surface area. Similarly, V curve and H curve indicate the vertical pole gain and the horizontal pole garn from the same area. It is noted that FIG. 9 discloses the compensation for the vertical pole and the horizontal pole in every angle of this area. The average gain of the present invention is 0.47 dBi and it is quite closed to the gain value of the monopole antenna.

While the invention has been described with reference to various illustrative embodiments, the description is not intended to be construed in a limiting sense. Various modifications of the illustrative embodiments, as well as other embodiments of the invention, will be apparent to those persons skilled in the art upon reference to this description. It is therefore contemplated that the appended claims will cover any such modifications or embodiments as may fall within the scope of the invention defined by the following claims and their equivalents.

What is claimed is:

1. An antenna for a portable device, the portable device having a display, a host and a hinge which is provided to connect the display and the host so that the portable device has an open state and a close state, wherein said hinge intergrally has a receiver so as to completely receive the antenna within the portable device.

2. The antenna as claimed in claim 1, wherein the portable device is a notebook computer.

3. The antenna as claimed in claim 1, wherein the portable device is a personal digital assistant.

4. The antenna as claimed in claim 1, wherein the portable device further comprises a RF unit and a DSP unit to process and convert the received signal.

5. The antenna as claimed in claim 4, wherein the RF unit and the DSP unit are bounded on a circuit board.

6. The antenna as claimed in claim 4, wherein the RF unit and the DSP unit are formed on a chip set and is connected on a main board of the portable device.

7. The antenna as claimed in claim 1, wherein said hinge comprises two receivers to receive two antennas so that each antenna receives signals of Bluetooth protocol and IEEE 802.11 protocol.

8. The antenna as claimed in claim 1, wherein the antenna is a inversed F type antenna.

9. The antenna as claimed in claim 1, wherein the antenna is a ceramics antenna.

10. A portable device comprising:
   a host to process data;
   a display to output the processing data;
   a hinge which is provided to connect the display and the host so that the portable device has and open state and a close state, said hinge integrally has a receiver formed within the portable device; and,
   an antenna which is completely received within said receiver to provide wireless communication.

11. The antenna as claimed in claim 10, wherein the portable device further comprises a RF unit and a DSP unit to process and convert the received signal.

12. The antenna as claimed in claim 11, wherein the RF unit and the DSP unit are bounded on a circuit board.

13. The antenna as claimed in claim 11, wherein the RF unit and the DSP unit are formed on a chip set and is connected on a main board of the portable device.

14. The antenna as claimed in claim 10, wherein said hinge comprises two receivers to receive two antennas so that each antenna receives signals of Bluetooth protocol and IEEE 802.11 protocol.

* * * * *